(12) United States Patent
Welter

(10) Patent No.: US 9,925,849 B2
(45) Date of Patent: Mar. 27, 2018

(54) SUN VISOR WITH LIGHTING DEVICE

(76) Inventor: Patrick Welter, Lachambre (FR)

( * ) Notice: Subject to any disclaimer, the term of this patent is extended or adjusted under 35 U.S.C. 154(b) by 223 days.

(21) Appl. No.: 12/810,828

(22) PCT Filed: Dec. 23, 2008

(86) PCT No.: PCT/EP2008/011080
§ 371 (c)(1),
(2), (4) Date: Sep. 27, 2010

(87) PCT Pub. No.: WO2009/083235
PCT Pub. Date: Jul. 9, 2009

(65) Prior Publication Data
US 2011/0019391 A1   Jan. 27, 2011

(30) Foreign Application Priority Data

Dec. 28, 2007   (DE) .......................... 10 2007 063 357
Jun. 12, 2008   (DE) .......................... 10 2008 027 923

(51) Int. Cl.
| | |
|---|---|
| *B60Q 1/00* | (2006.01) |
| *B60Q 1/26* | (2006.01) |
| *B60J 3/02* | (2006.01) |
| *B60Q 3/252* | (2017.01) |

(52) U.S. Cl.
CPC ............ *B60J 3/0282* (2013.01); *B60Q 3/252* (2017.02)

(58) Field of Classification Search
CPC ...... B60J 3/0204; B60J 3/0278; B60J 3/0282; B60Q 3/0226
USPC ..................... 362/492, 84, 135–137; 248/466
See application file for complete search history.

(56) References Cited

U.S. PATENT DOCUMENTS

| | | | | |
|---|---|---|---|---|
| 1,435,160 | A * | 11/1922 | Hoegemann ........... | A45D 33/32 132/314 |
| 2,068,781 | A * | 1/1937 | Wendel ..................... | 362/296.06 |
| 2,466,454 | A * | 4/1949 | Logan .................... | B60J 3/0282 362/141 |
| 3,163,364 | A * | 12/1964 | Ritter ..................... | A45C 15/06 362/137 |
| 3,598,987 | A | 8/1971 | Kipping | |
| 4,227,241 | A | 10/1980 | Marcus | |
| 4,421,355 | A * | 12/1983 | Marcus ......................... | 296/97.5 |
| 4,424,355 | A * | 1/1984 | Belanger et al. ............... | 546/35 |
| 4,486,819 | A * | 12/1984 | Marcus et al. ................ | 362/492 |
| 4,929,866 | A * | 5/1990 | Murata ................. | F21S 48/215 313/113 |
| 4,947,296 | A * | 8/1990 | Takeuchi et al. ............. | 362/135 |

(Continued)

FOREIGN PATENT DOCUMENTS

| | | |
|---|---|---|
| DE | 3930122 A1 | 11/1990 |
| DE | 44 40 195 A1 | 5/1995 |

(Continued)

OTHER PUBLICATIONS

International Search Report corresponding to PCT/EP2008/011080, dated Apr. 22, 2009, 3 pages.

(Continued)

*Primary Examiner* — Jong-Suk (James) Lee
*Assistant Examiner* — Tsion Tumebo
(74) *Attorney, Agent, or Firm* — Fletcher Yoder, P.C.

(57) ABSTRACT

Sun visor body with a light source and a mirror, wherein a surface facing the mirror is reflectively configured.

16 Claims, 2 Drawing Sheets

(56) References Cited

U.S. PATENT DOCUMENTS

| | | | |
|---|---|---|---|
| 5,117,337 A * | 5/1992 | Sakuma | B60J 3/0282 |
| | | | 296/97.5 |
| 5,442,530 A * | 8/1995 | Viertel et al. | 362/137 |
| 5,473,516 A * | 12/1995 | Van Order et al. | 362/492 |
| 5,560,704 A | 10/1996 | Hiemstra et al. | |
| 5,575,552 A | 11/1996 | Faloon et al. | |
| 6,264,352 B1 * | 7/2001 | Zapinski | 362/492 |
| 6,497,504 B2 * | 12/2002 | Macher et al. | 362/492 |
| 6,669,859 B1 * | 12/2003 | Tiesler | 16/334 |
| 6,692,060 B1 | 2/2004 | Wilson | |
| 2005/0200473 A1 * | 9/2005 | Noguchi et al. | 340/507 |
| 2006/0181893 A1 * | 8/2006 | Fernandez et al. | 362/494 |
| 2006/0198123 A1 * | 9/2006 | Radu | B60J 3/0282 |
| | | | 362/135 |
| 2006/0262519 A1 * | 11/2006 | Hirschburger et al. | 362/119 |
| 2015/0138813 A1 * | 5/2015 | Salter | B60Q 3/0226 |
| | | | 362/510 |

FOREIGN PATENT DOCUMENTS

| | | |
|---|---|---|
| DE | 10 2006008297 A1 | 9/2006 |
| EP | 0 265 404 A2 | 4/1998 |

OTHER PUBLICATIONS

Translation of Written Opinion dated Apr. 22, 2009 in PCT/EP2008/011080, 5 pages.
International Preliminary Report on Patentability dated Jun. 29, 2010 in PCT/EP2008/011080, 11 pages.
Translation of International Preliminary Report on Patentability dated Aug. 10, 2010 in PCT/EP2008/011080, 11 pages.

* cited by examiner

SUN VISOR WITH LIGHTING DEVICE

The invention relates to a sun visor body with a light source and a mirror and a cover of the mirror.

Sun visor bodies with a light source are known from the prior art, for example from DE 39 30 122 C2 or DE 10 2006 008 297 A1. However, the sun visor bodies from the prior art have the disadvantage that they are comparatively complicated to produce, are of comparatively thick design, and/or that the illumination of the face of a vehicle seat occupant is unsatisfactory.

It is the object of the invention to achieve a satisfactory illumination of the face of the seat occupant, particularly in the case of thin sun visors.

The object is achieved with the aid of a sun visor body with a light source and a mirror, a surface facing the mirror being of reflective design.

According to the invention, the sun visor body has a mirror and at least one, preferably a plurality of light sources. The mirror and/or the light sources can be incorporated in the sun visor body and/or be part of a common cassette. In accordance furthermore with the invention, the sun visor body has a reflecting surface facing the mirror; that is to say the reflecting surface can be viewed at least partially with the mirror. The sun visor body can be brought reversibly from a rest position, in which it is located in a fashion substantially parallel to the roof of a motor vehicle, into a use position in which it protects a vehicle seat occupant against the sun, and/or in which the mirror is available for viewing to a vehicle seat occupant.

The mirror preferably has a cover that can be reversibly folded away for using the mirror. Upon being folded away, the cover can with particular preference assume any desired angle between mirror and cover, in particular in a self-locking fashion. This angle is preferably 70-110°. This angle can preferably be adjusted by the vehicle seat occupant. The cover can be part of the abovementioned cassette.

The reflecting surface is preferably provided on this cover, in particular on the inside thereof facing the mirror.

The reflecting surface is preferably a bright, in particular white surface or one of metallic appearance.

The reflecting surface is preferably provided in a light-scattering fashion.

In a preferred embodiment of the present invention, the light source is arranged in the edge region of the mirror, with particular preference to the right and/or the left thereof. A plurality of light sources are preferably present.

The light source is preferably invisible to the vehicle seat occupant.

The light source is preferably designed to be focused in spot-type fashion, the light beams being focused with very particular preference in the direction of the reflecting surface.

The light source is preferably an LED, OLED and/or a tubular lamp.

A light beam emanating from the light source is preferably reflected by the reflecting surface in the direction of a vehicle seat occupant.

It is therefore provided according to the invention to equip the sun visor with at least one light source, preferably focused in a spot-type fashion, which radiates towards a reflector that is provided on the sun visor and which can deflect the light beam in the direction of the relevant seat occupant. The reflector is preferably designed as an upwardly pivotable cover of a mirror cassette of the sun visor, the surface side of the cover that faces the make-up mirror in the closed position of the cover serving as reflector in the open position, which is folded up approximately at right angles. The relevant surface side of the reflector is preferably brightly colored, preferably white, and has a high reflectance. In principle, however, the reflector can also be designed independently of the mirror cassette.

The invention is explained below with the aid of FIGS. 1-4. These explanations are merely exemplary and do not restrict the general idea of the invention.

Figure 1:
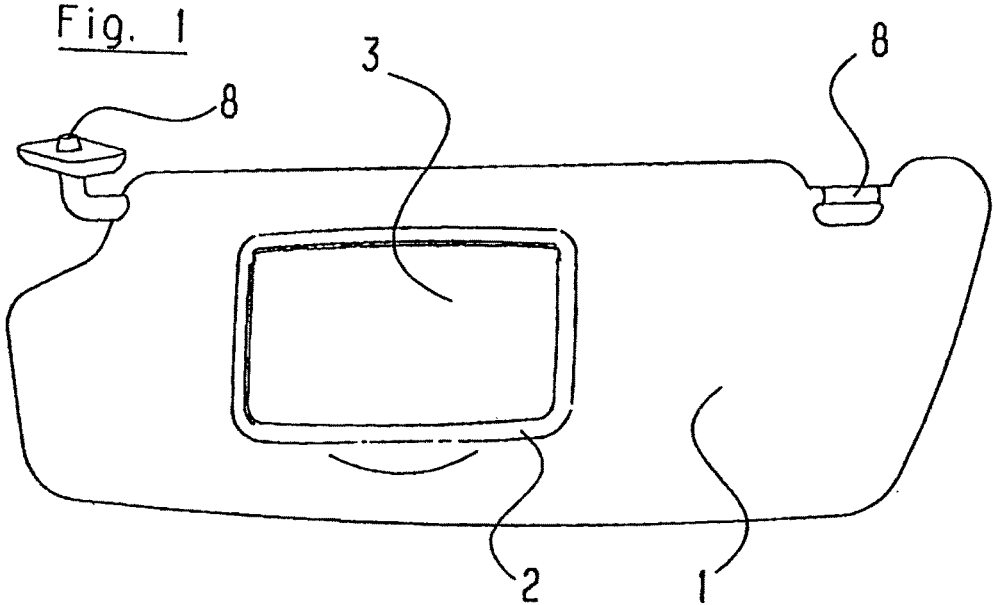
FIG. 1 shows the sun visor body with closed cover.

The sun visor shown in FIG. 1 consists of a sun visor body 1 in which there is incorporated a mirror cassette 2 with a cover 3 that is in closed position and can be folded upwards therefrom by an angle of at least 90° or more. The sun visor body 1 can, for its part, be pivoted in articulated joints 8 from its stowed position parallel to the roof into the illustrated position for shading and making up. The sun visor is also provided with electric energy by the articulated joint 8 or by the articulated joints 8.

Figure 2:
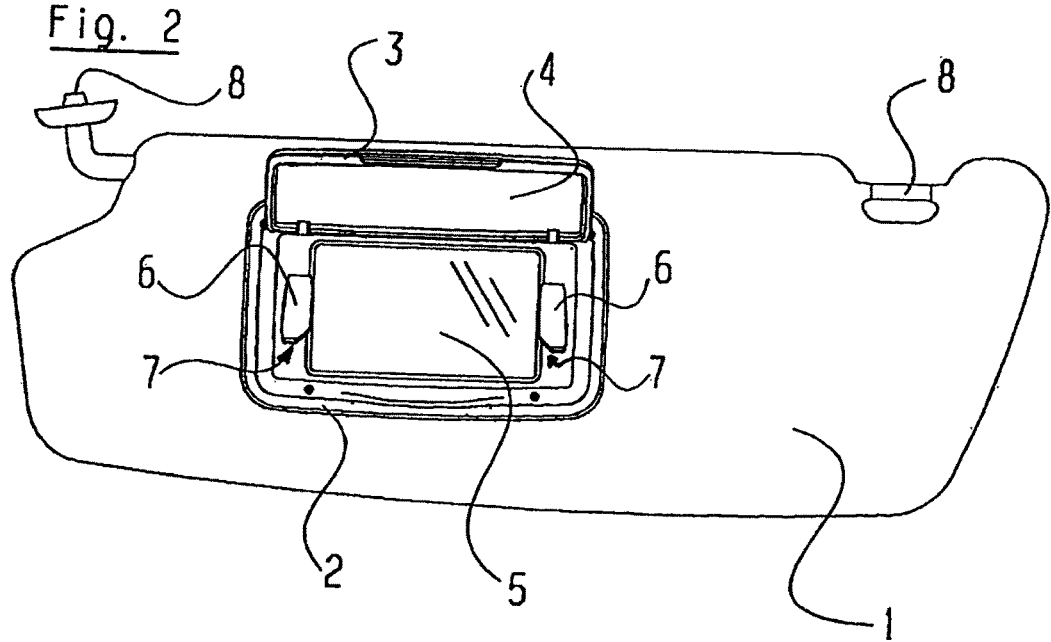
FIG. 2 shows the sun visor body with open cover.

As illustrated in FIG. 2, after the cover 3 is folded up the make-up mirror 5 as well as light sources 7, for example LEDs, OLEDs and/or tubular lamps, become visible in the mirror cassette 2. The cover 3 can preferably be adjusted at any desired angle between 0 and 160° relative to the mirror 5, with particular preference in a self-locking fashion. Alternatively or in addition, there is at least one open position into which the cover latches after being opened, or in which the cover presses against a stop after being opened. The light sources 7 or the light source 7 are/is designed as light source(s) 7 which radiate(s) in spot-type, that is to say focused, fashion and, after the opening of the cover 3 and the associated actuation of an electric switch, radiate(s) obliquely upwards in the direction of the inner surface side, designed as a reflector 4, of the cover 3. In particular, the aperture angle of the cone of light emitted by the light source 7 lies in the range from 5° to 50°, preferably from 10° to 40°, with particular preference from 15° to 30°. In the exemplary embodiment, a light channel 6 or a depression 6 which respectively exhibits a shading effect (in the manner of a screen) is arranged for each light source 7 (for example two light sources 7 which are arranged on both sides of the make-up mirror 5).

Figure 3:
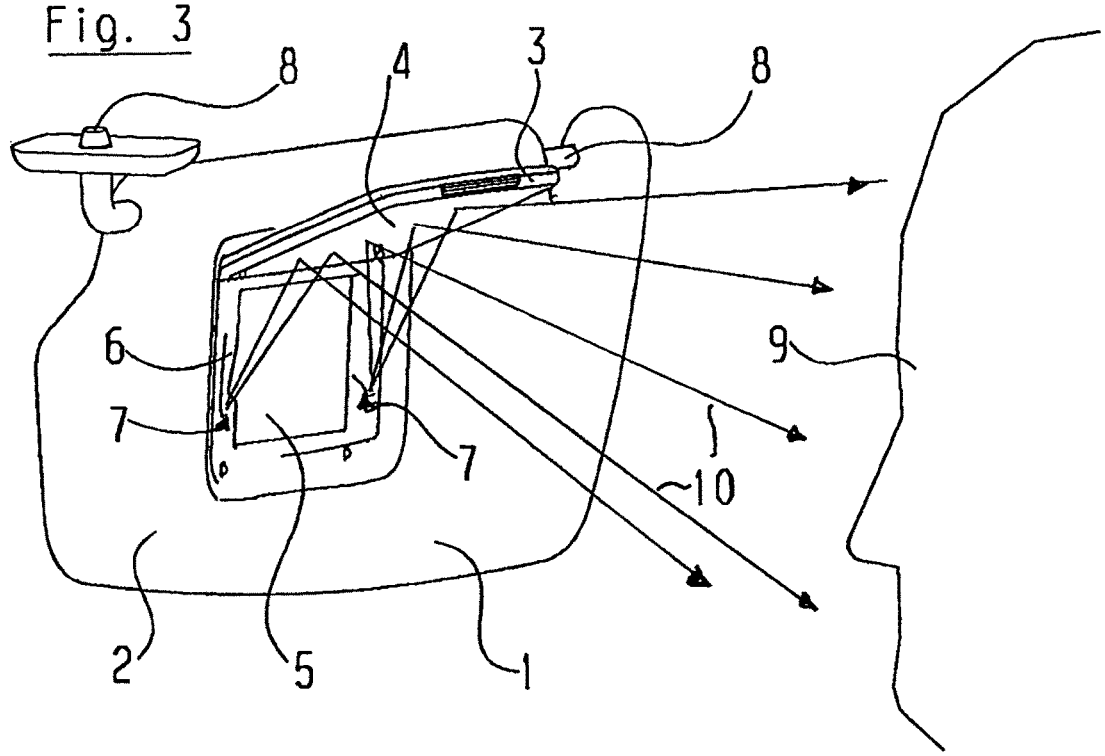
FIG. 3 shows the course of the light beams of the light source.
Figure 4:
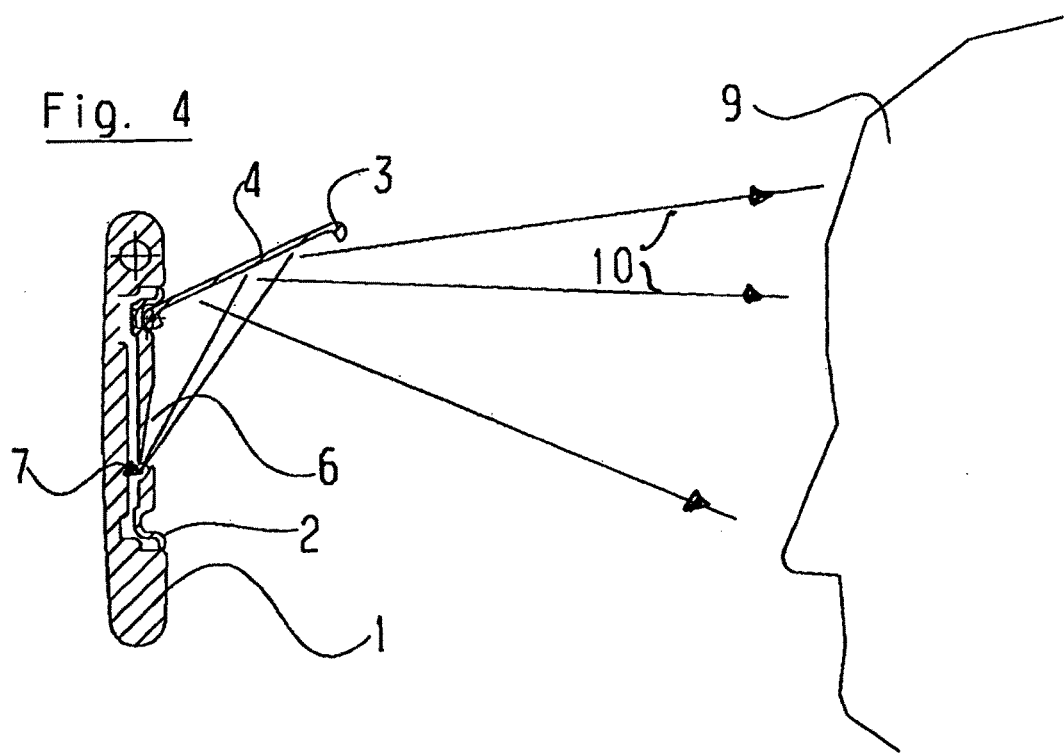
FIG. 4 shows a section through the arrangement in accordance with FIG. 3.

As may be seen from FIGS. 3 and 4, the light beams 10 emanating from the light source 7 are deflected by the reflector 4 in the direction of the seat occupant 9, it being possible for the reflection or scattering occurring thereby to be influenced by the surface structure of the reflector 4.

The sun visor body according to the invention lights only the face of the vehicle occupant, while the surroundings of the face remain largely dark.

LIST OF REFERENCE NUMERALS

1 Sun visor body
2 Mirror cassette
3 Cover
4 Reflector
5 Make-up mirror
6 Light channel/depression
7 Light source
8 Articulated joint
9 Seat occupant
10 Light beam

The invention claimed is:

1. A sun visor body for a vehicle comprising:
   a light source configured to radiate light beams of visible light;
   a mirror; and
   a cover having an inner surface facing the mirror, the inner surface being configured as a reflector and having a reflecting surface,
   wherein the mirror is not attached to the inner surface,
   wherein the light source is configured to provide focused light beams that are radiated by the light source obliquely upward into a cone, the light source is configured to direct the cone of light beams toward the inner surface of the cover, and the reflecting surface is configured to reflect the light beams emanating from the light source in a light-scattering fashion.

2. The sun visor body as claimed in claim 1, wherein the light source is arranged in the edge region of the mirror.

3. The sun visor body as claimed in claim 1, wherein the light source is at least one of an LED, OLED and a tubular lamp.

4. The sun visor body as claimed in claim 1, wherein the angle between the mirror and the cover is adjustable.

5. A sun visor for a vehicle comprising:
   a sun visor body;
   a mirror coupled to the sun visor body;
   a cover at least partially disposed over the mirror and configured to be folded upwards to an open position to allow an occupant of a vehicle seat to view the mirror, the cover having an inner surface that is in the form of a reflector; and
   at least one light source configured to radiate light beams of visible light;
   wherein the at least one light source is configured to provide focused light beams that are radiated by the light source obliquely upward into a cone, and the at least one light source is configured to direct the cone of light beams only to the inner surface of the cover when the cover is in the open position, and
   wherein the reflector is configured to scatter the light beams.

6. The sun visor of claim 5, wherein the cover is disposed over the mirror and the at least one light source when in a closed position.

7. The sun visor of claim 5, wherein the cover is configured to be rotated less than approximately 160 degrees relative to the mirror when being folded upwards to the open position.

8. The sun visor of claim 7, wherein the cover is configured to be rotated between approximately 70 degrees and approximately 110 degrees relative to the mirror when being folded upwards to the open position.

9. The sun visor of claim 5, wherein the light beam radiating from the at least one light source radiates obliquely upwards in a range of approximately 5 degrees to approximately 50 degrees relative to the mirror.

10. The sun visor of claim 9, wherein the light beam radiating from the at least one light source radiates obliquely upwards in a range of approximately 15 degrees to approximately 30 degrees relative to the mirror.

11. The sun visor of claim 5, further comprising a light channel associated with each at least one light source, the light channel being configured to provide a shading effect that assists in directing the light beam obliquely upwards.

12. The sun visor of claim 11, wherein the light channel comprises a first light channel provided at a first side of the mirror and a second light channel provided at an opposite second side of the mirror, wherein the at least one light source comprises a first light source associated with the first light channel and a second light source associated with the second light channel.

13. The sun visor of claim 5, wherein the sun visor body, the cover and the at least one light source form a cassette that is coupled to the sun visor body.

14. The sun visor of claim 5, wherein the reflector comprises at least one of a white and a metallic surface having high reflectance.

15. The sun visor of claim 5, wherein the reflector is configured to scatter the light beams only on a face of the vehicle seat occupant.

16. The sun visor of claim 5, wherein the cover is self-locking such that the cover can be selectively retained in a number of positions as the cover is being folded upwards.

* * * * *